(12) United States Patent
Sguazzotti et al.

(10) Patent No.: US 7,643,758 B1
(45) Date of Patent: Jan. 5, 2010

(54) CWDM SYSTEM ARCHITECTURE WITH AMPLIFICATION

(75) Inventors: Alessandro Sguazzotti, Caponago (IT); Cristiana Muzio, Ivrea (IT)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 11/306,618

(22) Filed: Jan. 4, 2006

(51) Int. Cl.
*H04B 10/00* (2006.01)
*H04J 14/02* (2006.01)

(52) U.S. Cl. .......................... 398/175; 398/48; 398/49; 398/50; 398/83; 398/173; 398/178; 398/180; 359/344; 359/349; 359/347; 359/337.1

(58) Field of Classification Search ................. 398/173, 398/175, 178, 180, 83, 48, 49, 50; 359/344, 359/349, 347, 337.1
See application file for complete search history.

(56) References Cited

U.S. PATENT DOCUMENTS

| 6,091,538 | A * | 7/2000 | Takeda et al. ........... 359/341.41 |
| 6,515,777 | B1 * | 2/2003 | Arnold et al. ................. 398/97 |
| 6,560,010 | B1 * | 5/2003 | DiJaili et al. ................ 359/344 |
| 6,757,100 | B2 * | 6/2004 | Koteles ....................... 359/344 |
| 6,882,466 | B1 * | 4/2005 | Shimojoh et al. ............ 359/334 |
| 2006/0291037 | A1 * | 12/2006 | Iannone et al. .............. 359/334 |

OTHER PUBLICATIONS

ITU-T G.694.2 Spectral Grids for WDM Applications: CWDM Wavelength Grid, Dec. 2003, International Telecommunication Union, p. 1-4.*

* cited by examiner

*Primary Examiner*—Ken N Vanderpuye
*Assistant Examiner*—Daniel G Dobson (57) ABSTRACT

Methods and apparatus for providing amplification to coarse wave division multiplexing channels or signals are disclosed. According to one aspect of the present invention, an arrangement that adds gain to a set of signals that may be divided into a first band including signals of lower wavelengths and a second band including signals of higher wavelengths includes a multiplexer, first and second optical amplifiers, and a processing arrangement. The multiplexer multiplexes the set of signals. The first optical amplifier has a first gain peak and provides amplification to the set of signals, while the second optical amplifier has a second gain peak and provides amplification to the second band but not to the first band. The processing arrangement passes the second band from the first optical amplifier to the second optical amplifier, and substantially prevents the first band from passing from the first optical amplifier to the second optical amplifier.

26 Claims, 7 Drawing Sheets

CWDM SYSTEM ARCHITECTURE WITH AMPLIFICATION

BACKGROUND OF THE INVENTION

1. Field of Invention

The present invention relates generally to optical networks. More particularly, the present invention relates to extending the span distances associated with coarse wavelength division multiplexing systems.

2. Description of the Related Art

In response to the ever-growing demand for fiber networks, coarse wave division multiplexing (CWDM) has been developed as an alternative to dense wavelength division multiplexing (DWDM). CWDM systems use uncooled lasers, and therefore allow a greater spacing between wavelengths or channels than DWDM systems. In general, CWDM is a relatively low cost solution that provides connection flexibility and increased throughput for metropolitan networks.

CWDM combines up to sixteen or eighteen wavelengths onto a single fiber, although many CWDM systems combine four or eight wavelengths onto a single fiber. CWDM technology uses an ITU standard approximately 20 nanometer (nm) spacing between wavelengths or channels. The wavelengths are typically between approximately 1270 nm and approximately 1610 nm.

Figure 1:
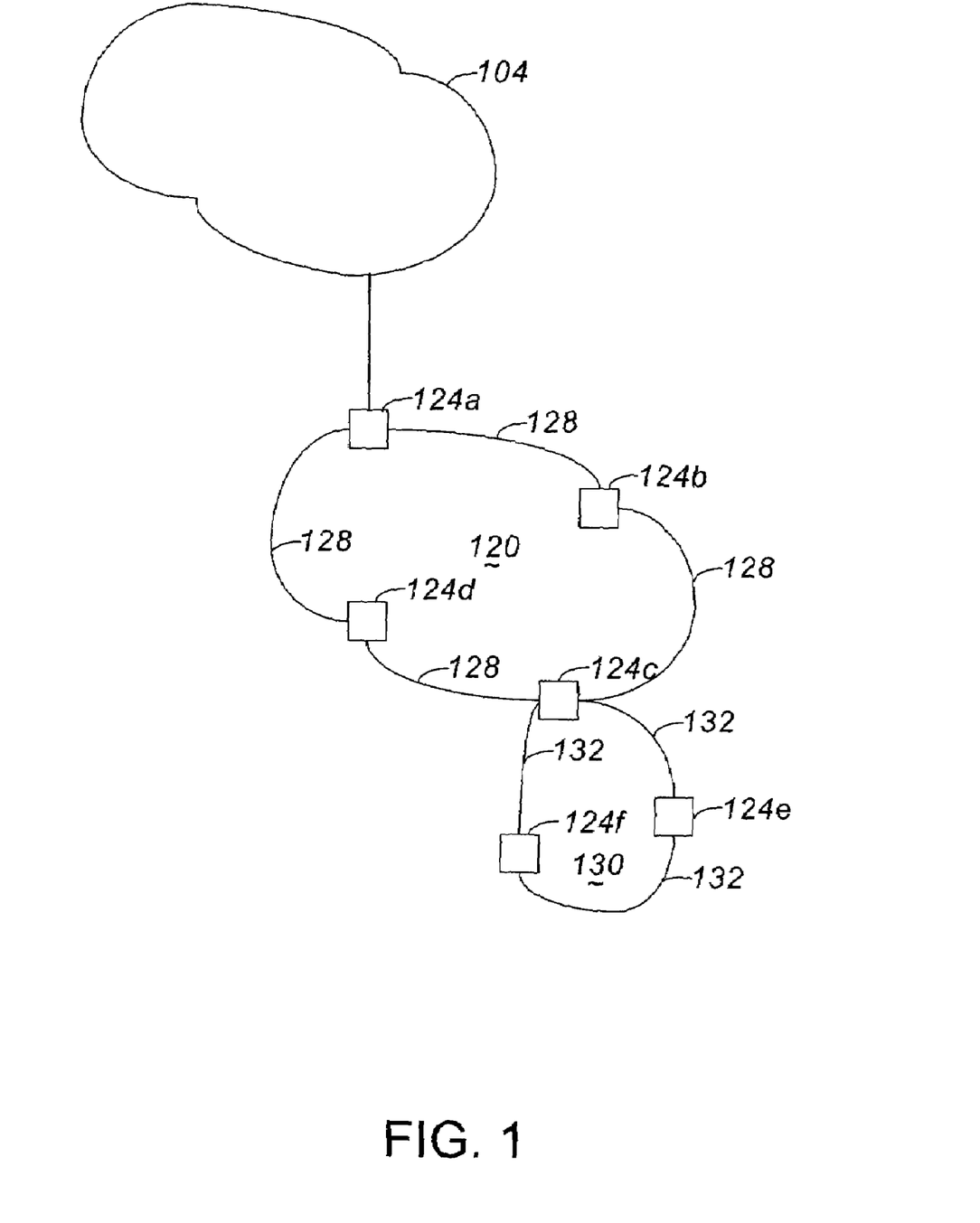
FIG. 1 is a diagrammatic representation of an overall network system that includes a system which communicates using coarse wavelength division multiplexing (CWDM).

FIG. 1 is a diagrammatic representation of an overall network system that includes a system which communicates using CWDM. A network 120 that is in communication with an overall Synchronous Optical Network (SONET) or Synchronous Digital Hierarchy (SDH) transport network 104 includes various nodes 124a-d that are in communication over links 128. Network 120 may be a metro network that uses CWDM. Any of nodes 124a-d, as for example node 124c, may be in communication with other nodes 124e, 124f across links 132. Nodes 124c, 124e, 124f may be part of a local area network.

When CWDM is used in network 120, the distances covered by links 128 are typically limited to being less than approximately 100 kilometers (km). That is, CWDM systems are generally limited by an optical span budget of approximately 100 km. To increase the distances over which CWDM communications may occur, optical amplifiers may be incorporated into network 120.

Optical amplifiers such as semiconductor optical amplifiers (SOAs) provide relatively high-speed switching capability and also provide the ability to add gain to optical signals. As will be understood by those skilled in the art, an SOA uses technology that is similar to that of a Fabry-Perot laser diode. In some CWDM systems, SOAs may be used as amplifiers to provide gain to optical signals relatively inexpensively. Adding gain to optical signals enables the optical signals to traverse a greater distance. That is, amplifying optical signals allows the span budget associated with optical signals to be increased.

Figure 2:
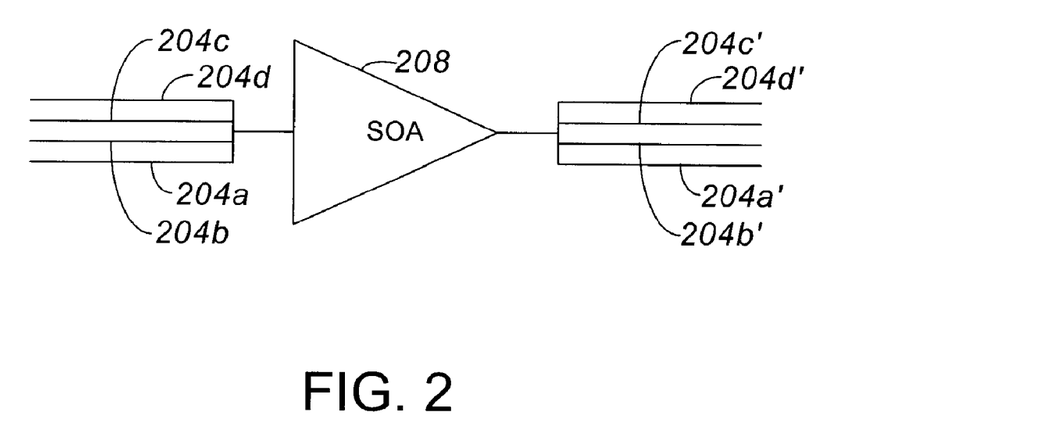
FIG. 2 is a block diagram representation of a four channel CWDM system that uses one semiconductor optical amplifier (SOA).

FIG. 2 is a block diagram representation of a four channel CWDM system that uses an SOA for amplification. Four CWDM channels 204a-d are provided as input into an SOA 208. SOA 208 amplifies channels 204a-d to produce amplified channels 204a'-d' as an output.

Figure 3:
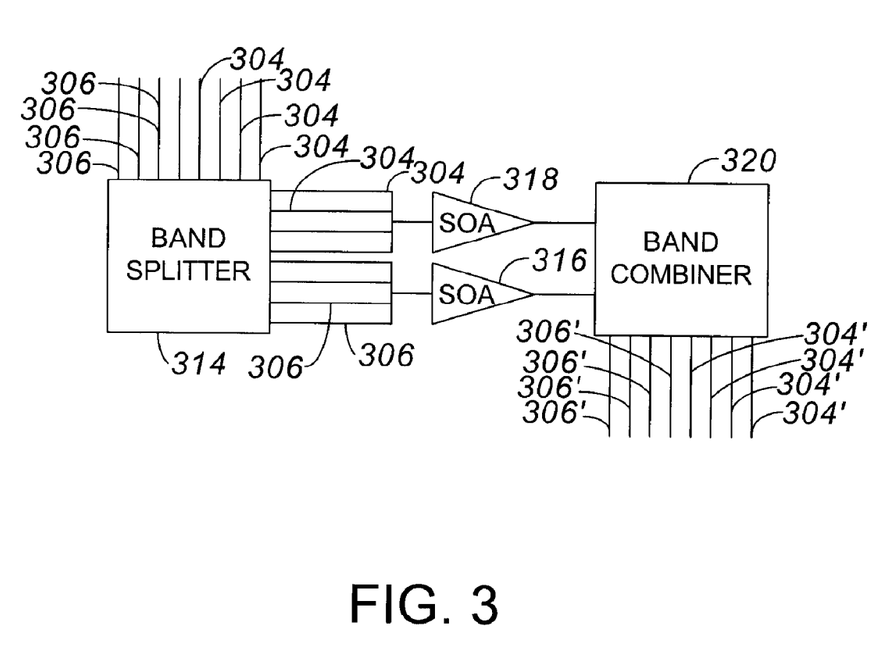
FIG. 3 is a block diagram representation of an eight channel CWDM system that uses a band splitter, two SOAs, and a band combiner.

An eight channel CWDM system, on the contrary, may utilize two SOAs which each amplify four channels. Two SOAs may be used due to the limited amplication bandwidth of SOAs. With reference to FIG. 3, a system which utilizes two SOAs in conjunction with a band splitter and a band combiner will be described. CWDM channels 304, 306 are provided to a band splitter 314 which substantially splits channels 304, 306 into low band channels 304 and high band channels 306. Low band channels 304 are then amplified by a first SOA 318, while high band channels 306 are amplified by a second SOA 316. The outputs of SOAs 316, 318 are provided to a band combiner 320 that recombines amplified low band channels 304' and amplified high band channels 306'.

Although the use of filters such as band splitter 314 and band combiner 320, in conjunction with SOAs 316, 318, is effective in providing amplification for eight channel CWDM systems, the use of the filters introduce additional loss that impacts and reduces the span budget. Filters such as band splitter 314 and band combiner 320 may occupy a significant amount of physical space.

Therefore, what is needed is a method and an apparatus which enables the maximum span budget in a CWDM system to be efficiently increased. That is, what is desired is a system that allows CWDM channels to be efficiently amplified such that the distances which may be traversed by signals traveling on the channels may be increased.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The span budget associated with a coarse wavelength division multiplexing (CWDM) system may generally be increased through the use of systems that include semiconductor optical amplifiers (SOAs). However, conventional CWDM systems that use SOAs to amplify, for example, eight channels typically include filters in addition to the SOAs which each amplify only four channels. The use of filters, while effective, generally has an adverse impact on the total span budget.

By utilizing an SOA arrangement in which a plurality of SOAs are cascaded, the span budget of a CWDM system may be efficiently increased. As will be appreciated by those skilled in the art, SOAs have asymmetrical gain curves that have bandwidths of approximately eighty nanometers (nm). To accommodate a bandwidth of approximately 160 nm for an eight channel CWDM system, the gains curves of the SOAs may be shifted such that substantially the entire 160 nm bandwidth is accommodated. Sending all wavelengths through a first SOA that is substantially optimized for a lower wavelength band and then sending only a higher wavelength band through a second SOA that is substantially optimized for the higher wavelength band, gain may be added to all wavelengths substantially without significant power absorption due to negative gains associated with the SOAs.

Figure 4A:
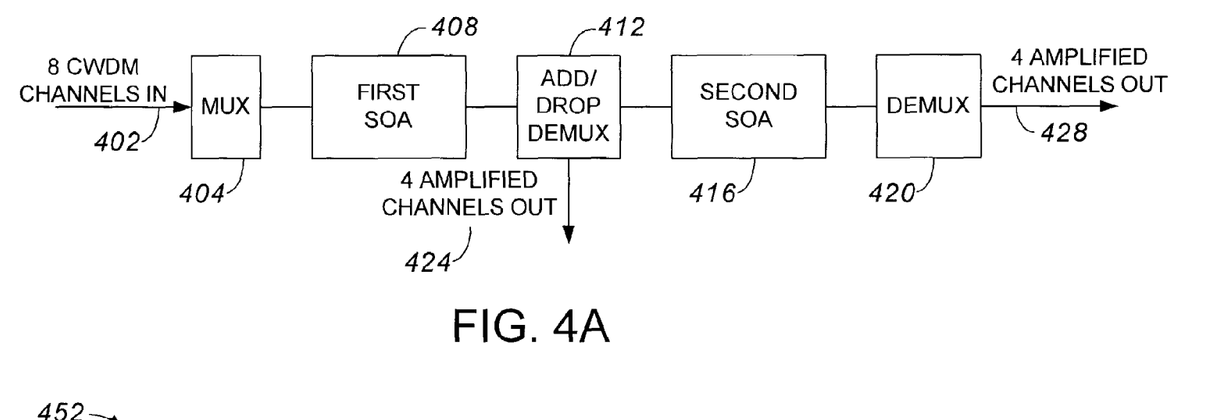
FIG. 4A is a block diagram representation of a CWDM system which includes two SOAs and a four channel add/drop demultiplexer in accordance with an embodiment of the present invention.

FIG. 4A is a block diagram representation of a system that includes two cascaded SOAs and an add/drop demultiplexer in accordance with an embodiment of the present invention. Input channels 402 are provided to a multiplexer 404. Input channels 402 are associated with CWDM transmissions, and generally are associated with eight wavelengths. It should be understood that the wavelengths are associated with optical signals carried in channels 402. The eight wavelengths are typically wavelengths of approximately 1470 nm, approximately 1490 nm, approximately 1510 nm, approximately 1530 nm, approximately 1550 nm, approximately 1570 nm, approximately 1590 nm, and approximately 1610 nm.

Multiplexer 404 is typically an 8:1 multiplexer, or an eight channel multiplexer. The output of multiplexer 404 is provided to a first SOA 408 that is configured to have a peak gain at approximately 1500 nm, i.e., the largest amount of gain for SOA 408 occurs at a wavelength of approximately 1500 nm. The gain curve associated with first SOA 408 will be discussed below with respect to FIGS. 5A and 5B. First SOA 408 is arranged to provide amplification to channels 402. It should be appreciated that first SOA 408 generally provides amplification to channels 402 with lower wavelengths as well as at least some channels 402 with higher wavelengths. Although channels 402 are described as being amplified for ease of discussion, as is known in the art, it is the optical signals carried within channels 402 are actually amplified.

The output of first SOA 408 is provided to an add/drop demultiplexer 412, which is typically a four channel add/drop demultiplexer, that is arranged to effectively drop lower band amplified channels 424, or channels 424 which have lower wavelengths. The remaining ones of channels 402, i.e., the four channels that are not dropped by add/drop the demultiplexer 412, are provided to a second SOA 416.

Second SOA 416 is arranged to provide amplifications to remaining channels 402, and is configured to have a different peak gain than first SOA 408. In the described embodiment, the peak gain associated with second SOA 416 occurs at approximately 1580 nm. After being amplified by second SOA 416, the amplified remaining channels are demultiplexed by a demultiplexer 420, e.g., a 1:4 or four channel demultiplexer. Then, amplified channels 428 are provided as output from demultiplexer 420.

Figure 4B:
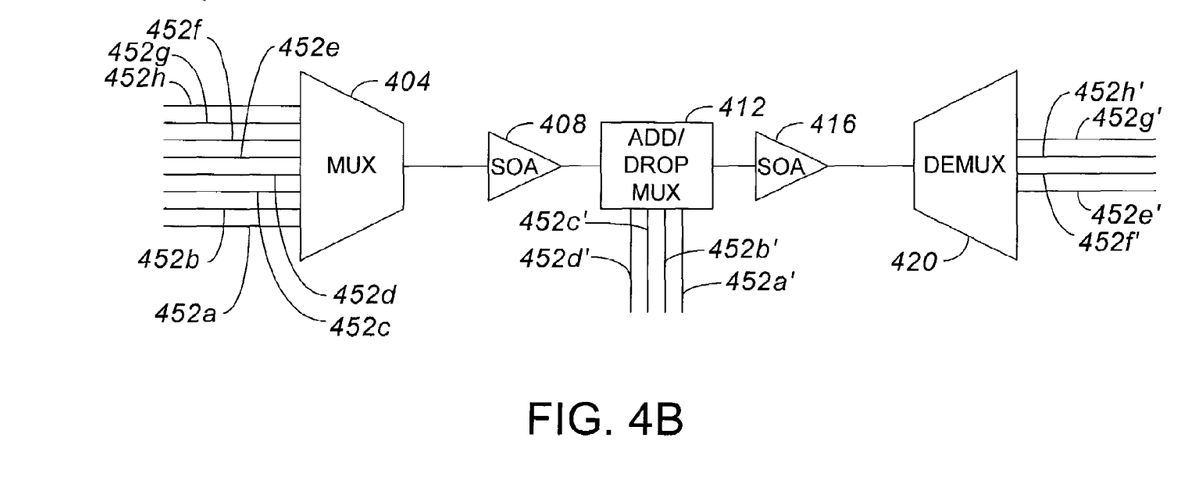
FIG. 4B is a block diagram representation of a CWDM system which includes two SOAs as well as a four channel add/drop demultiplexer, and input and output channels associated with the CWDM system in accordance with an embodiment of the present invention.

With reference to FIG. 4B, the disposition of actual signals which are processed by SOAs 408, 416 and add/drop demultiplexer 412 will be discussed in accordance with an embodiment of the present invention. Input CWDM channels or wavelengths 452 are provided as inputs to multiplexer 404. In the described embodiment, channels 452 include lower band channels 452a-d and higher band channels 452e-h. Channels 452a-d generally all have lower wavelengths than channels 452e-h.

Channels 452 are all multiplexed by multiplexer 404, and the output of multiplexer 404, which contains channels 452, is provided to first SOA 408. First SOA 408, which is arranged to provide amplification to channels 452a-d, also provides some amplification to channels 452e-h. Add/drop demultiplexer 412 then drops amplified channels 452a'-d' and, as a result, allow channels 452a'-d' to be provided to their intended destination. Channels 452e-h, which have not been dropped, are provided to second SOA 416 which is arranged to provide amplification. The output of second SOA 416, which contains channels 452e-h after amplification, are demultiplexed by demultiplexer 420. Amplified channels 452e'-h', which are the output of demultiplexer 420, are then ready to be provided to their intended destination.

To substantially control the channels that are amplified by each SOA 408, 416, SOAs 408, 416 may be configured to have peak gains that occur at wavelengths which are appropriate for the channels that each SOA 408, 416 is intended to amplify. As will be appreciated by those skilled in the art, the bandwidth associated with the gain of an SOA is typically approximately ±40 nm around the wavelength that corresponds to a peak gain amount. Hence, by centering the peak associated with an SOA that is intended to amplify lower band channels, it may have a peak gain substantially in the middle of the lower band; this way, substantially all lower band channels may be amplified without causing attenuation in the higher band channels. Similarly, an SOA that is intended to amplify higher band channels may have a peak gain substantially in the middle of the higher band. However, to avoid causing attenuation due to negative gains in lower band channels with an SOA that is intended to amplify higher band channels, the lower band channels may be prevented from being processed by the SOA that is intended to amplify the higher band channels.

Figure 5A:
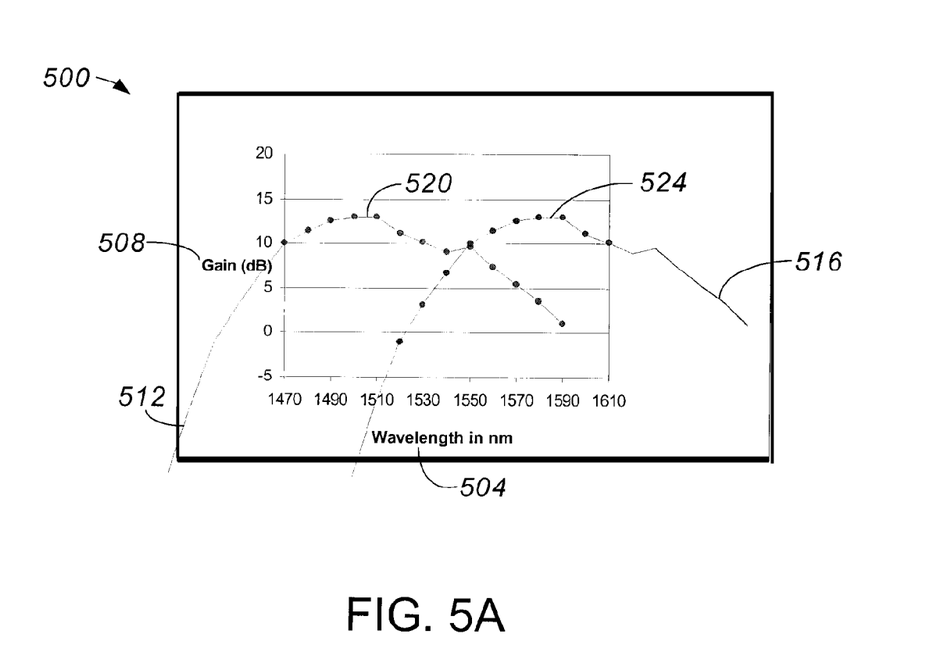
FIG. 5A is a graphical representation of gain peaks for two SOAs in accordance with an embodiment of the present invention.

Referring next to FIG. 5A, gain curves associated with cascaded SOAs will be described in accordance with an embodiment of the present invention. A graphical representation 500 includes a gain axis 508 and a wavelength axis 504. Gain axis 508 is arranged to indicate a gain in decibels (dB), while wavelength axis 504 is arranged to indicate a wavelength in nm. A first gain curve 512 is associated with an SOA that is arranged to provide gain for lower band channels or wavelengths. In the described embodiment, the lower band wavelengths are wavelengths of approximately 1470 nm, approximately 1490 nm, approximately 1510 nm, and approximately 1530 nm. Hence, an approximate peak 520 of first gain curve 512 is arranged, e.g., shifted or otherwise manipulated, to occur at approximately 1500 nm such that each of the lower band wavelengths may be amplified.

A second gain curve 516 is associated with an SOA that is arranged to provide gain for higher or upper band wavelengths. The upper band wavelengths, in the described embodiment, are wavelengths of approximately 1550 nm, approximately 1570 nm, approximately 1590 nm, and approximately 1610 nm. An approximate peak 524 of second gain curve 516 is arranged to occur at approximately 1580 nm. The location of approximate peak 524 at approximately 1580 nm allows substantially all of the upper band wavelengths to be amplified.

Figure 5B:
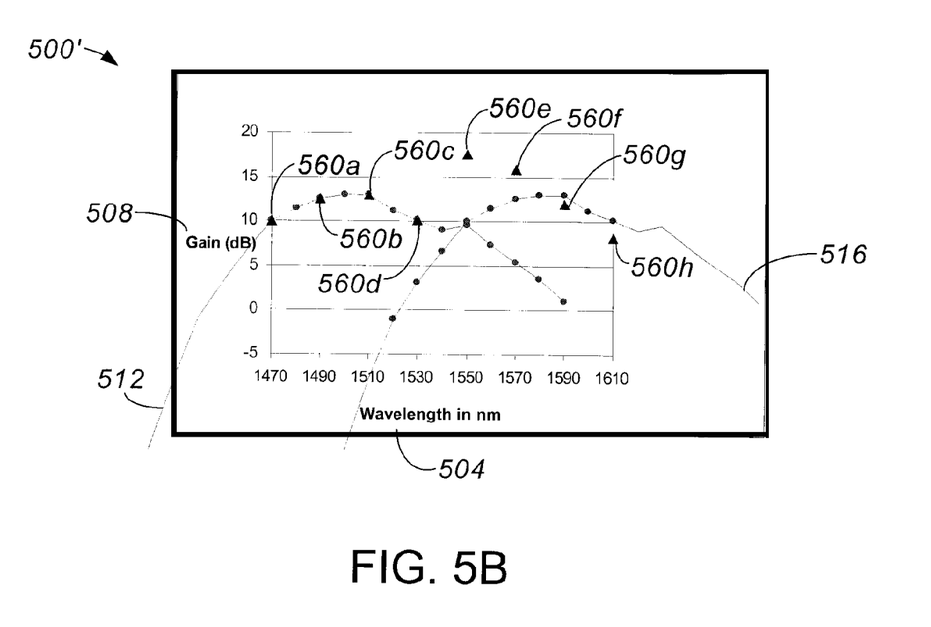
FIG. 5B is a graphical representation of gain peaks for two SOAs and corresponding CWDM channel gains in accordance with an embodiment of the present invention.

To prevent negative gains in second gain curve 516 from adversely affecting lower band wavelengths by causing gain absorption, the lower band wavelengths are effectively prevented from being amplified by second gain curve 516. As previously discussed, a low band demultiplexer or add/drop demultiplexer may be used to prevent lower band wavelengths from being affected by second gain curve 516. FIG. 5B is a graphical representation 500' of first gain curve 512, second gain curve 516, and the amplified gains 560a-h associated with channels. The amplified gains 560a-d for lower band channels are such that the gains are approximately reflected by first gain curve 512, i.e., gains 560a-d for lower band channels substantially coincide with first gain curve 512.

Negative gains on gain curves 512, 516 generally have an adverse affect on amplified gains 560a-h associated with channels. As such, lower band channels are not amplified by an SOA associated with second gain curve 516, i.e., amplified gains 560a-d associated with channels are affected substantially only by first gain curve 512 and not by second gain curve 516. Gain curve 512 has negative gains for wavelengths above approximately 1600 nm. Hence, for a higher band channel with a wavelength of approximately 1610 nm, gain curve 512 may cause some attenuation of or gain absorption. However, the effect of second gain curve 516 on higher band channels is such that the overall amplified gain associated with the channel associated with a wavelength of approximately 1610 nm is positive as indicated by amplified gain 560h, albeit slightly less than the value on second gain curve 516 at approximately 1610 nm.

As first gain curve 512 and second gain curve 516 both have a positive effect on higher band channels with wavelengths of approximately 1550 nm and 1570 nm, amplified gains 560e, 560f have gain values that are greater than the values associated with both first gain curve 512 and second gain curve 516. Amplified gain 560g, which corresponds to a higher band channel with a wavelength of approximately 1590 nm, has a value that is close to the gain associated with second gain curve 516.

Figure 6A:
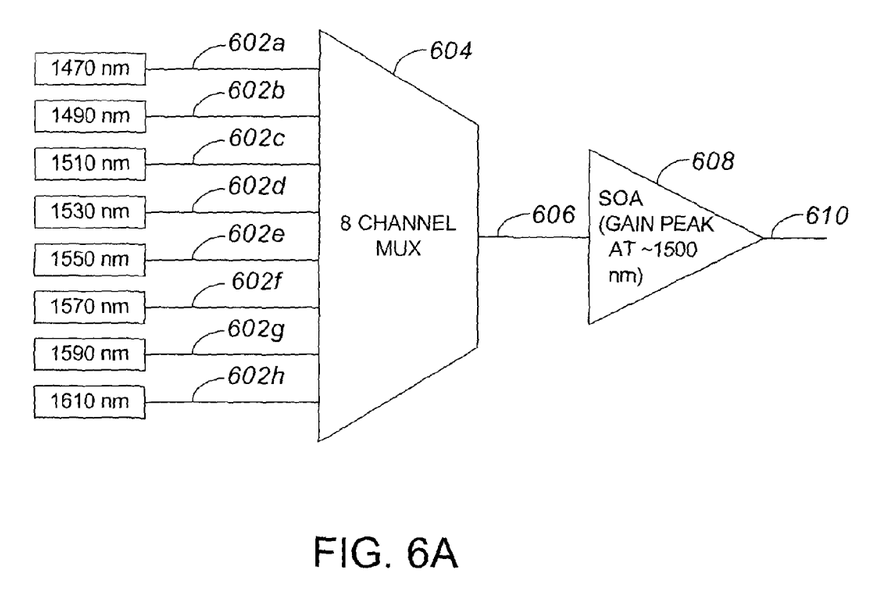
FIG. 6A is a block diagram representation of a multiplexer and an SOA with a gain peak that occurs at approximately 1500 nanometers (nm) in accordance with an embodiment of the present invention.
Figure 6B:
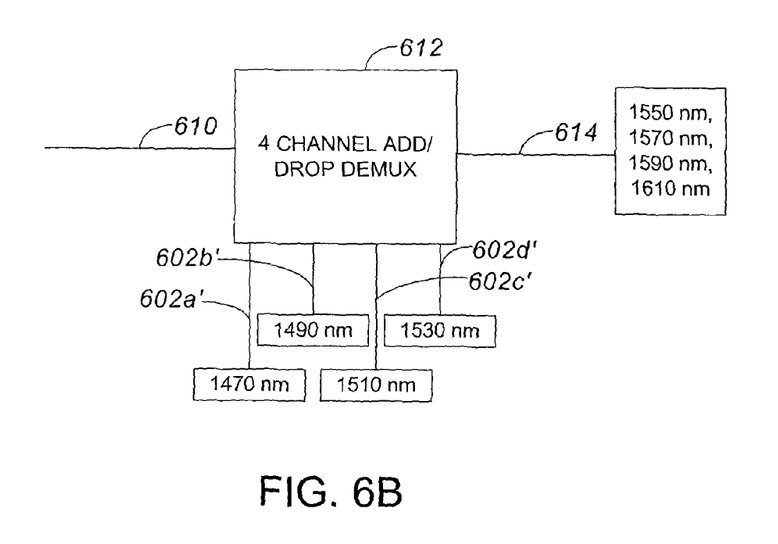
FIG. 6B is a block diagram representation of an add/drop demultiplexer in accordance with an embodiment of the present invention.
Figure 6C:
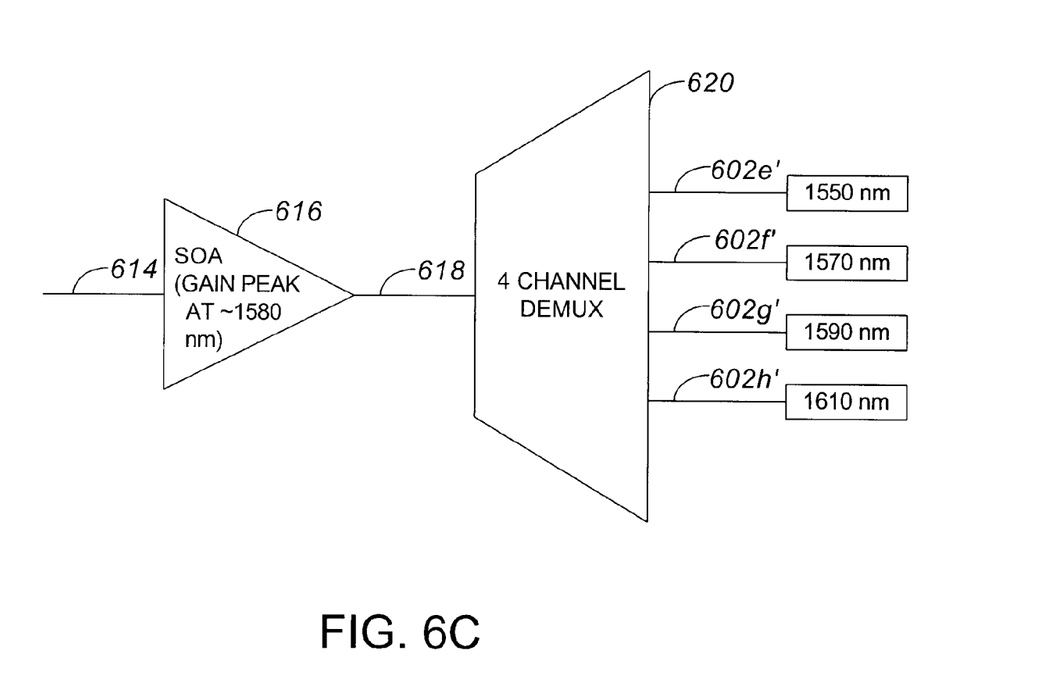
FIG. 6C is a block diagram representation of an SOA with a gain peak that occurs at approximately 1580 nm and a demultiplexer in accordance with an embodiment of the present invention.

Using a cascaded SOA arrangement as shown in FIGS. 4A and 4B allows the gain associated with CWDM channels in a band with a width of approximately 140 nm to be increased by at least five dB, as indicated in FIG. 5B. Using two SOAs in a cascaded arrangement to achieve a gain increase is efficient and relatively easy to implement. With reference to FIGS. 6A-6C, a cascaded SOA arrangement such as the cascaded SOA arrangement of FIG. 4B will be described in terms of an eight channel CWDM band with wavelengths in the range between approximately 1470 nm and approximately 1610 nm in accordance with an embodiment of the present invention. An eight channel CWDM band includes channels or wavelengths 602a-h, as shown in FIG. 6A. Lower band channels 602a-d have wavelengths of approximately 1470 nm, approximately 1490 nm, approximately 1510 nm, and approximately 1530 nm, respectively. Higher band channels 602e-h have wavelengths of approximately 1550 nm, approximately 1570 nm, approximately 1590 nm, and approximately 1610 nm.

Channels 602a-h are provided as inputs to a multiplexer 604 which multiplexes channels 602a-h, and creates a signal 606 that includes information associated with channels 602a-h. Signal 606 is then provided as an input into an SOA 608 that has a peak gain at approximately 1500 nm. SOA 608 amplifies signal 606 and, as a result, effectively amplifies at least some channels 602a-h. Some channels 602a-h, e.g., lower band channels 602a-d, are amplified while others, e.g., higher band channel 602h, may be subjected to attenuation or gain absorption.

A signal 610 generated by SOA 608 is passed as an input into an add/drop demultiplexer 612, as shown in FIG. 6B. Add/drop demultiplexer 612 is arranged to demultiplex and drop amplified lower band channels contained in signal 610. As shown, amplified lower band channels 602a'-d' are dropped by add/drop demultiplexer 612. A signal 614 which contains information pertaining to higher band channels is allowed to substantially pass through add/drop demultiplexer 612.

Signal 614 is provided as input into an SOA 616 that is arranged to effectively amplify higher band channels, as shown in FIG. 6C. As higher band channels have wavelengths in a band between approximately 1550 nm and approximately 1610 nm, SOA 616 is arranged to have a peak gain at approximately 1580 nm. SOA 616 generates a signal 618 that is passed into a demultiplexer which demultiplexes amplified higher band channels 602e'-h' from signal 618.

Figure 7:
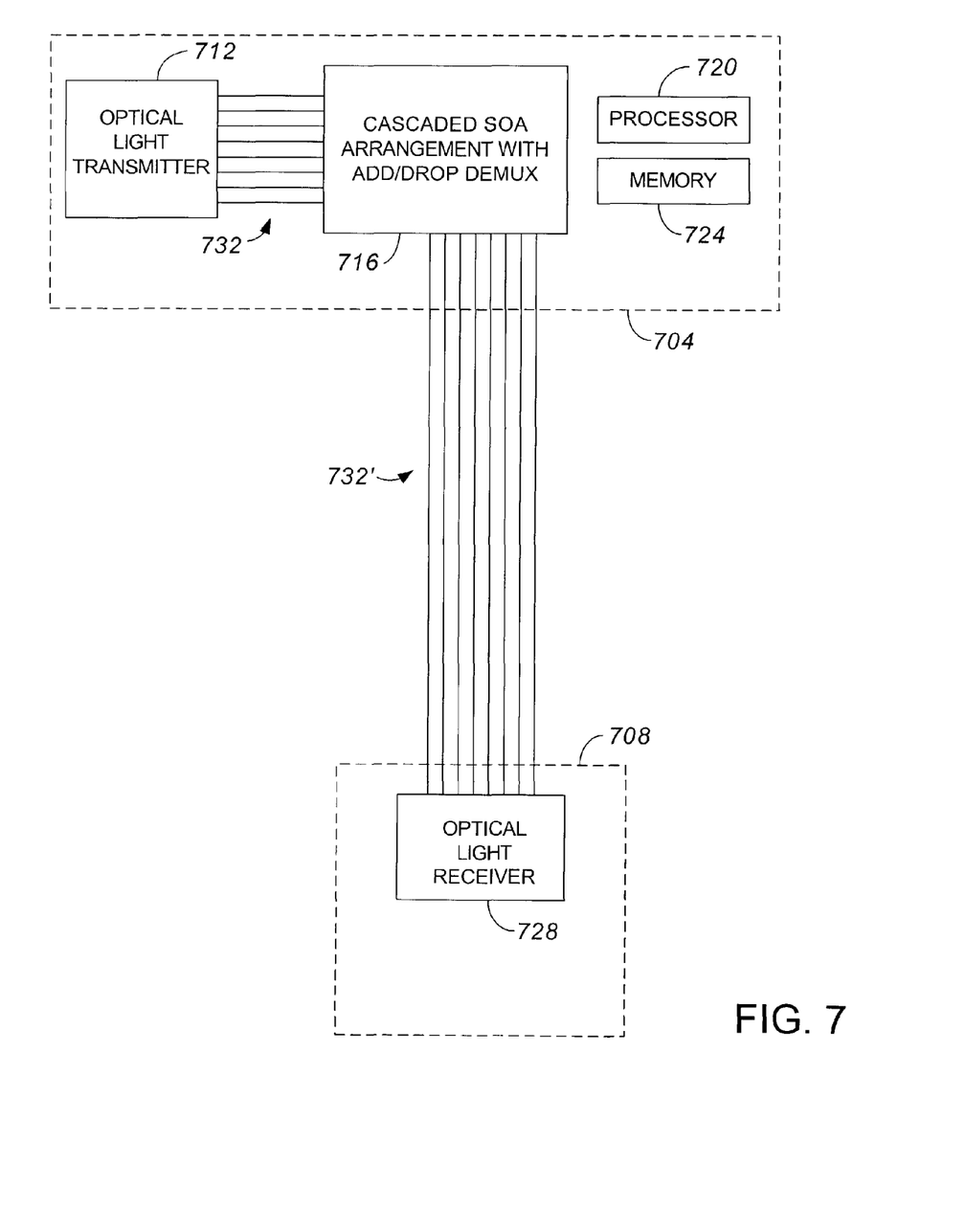
FIG. 7 is a block diagram representation of a network node within an optical network that is arranged to add gain to CWDM signals using a cascaded SOA arrangement with an add/drop demultiplexer in accordance with an embodiment of the present invention.

A cascaded SOA arrangement as shown, for example, in FIGS. 4A and 4B is often implemented as part of a network element or node within an optical network. FIG. 7 is a block diagram representation of a network node within an optical network that is arranged to add gain to CWDM signals using a cascaded SOA arrangement with an add/drop demultiplexer in accordance with an embodiment of the present invention. Within a network that includes multiple network nodes or elements, a node 704 includes a cascaded SOA arrangement 716. Node 704 may generally also include a processor 720 and memory 724 which stores data and code devices which may be processed by processor 720.

An optical light transmitter 712 or light source in node 704 produces CWDM signals 732 of approximately eight wavelengths. As discussed above, signals 732 may include a lower band wavelengths and higher band wavelengths. Signals 732 are processed by cascaded SOA arrangement 716 which increases the span budget associated with signals 732 by, in one embodiment, at least approximately six or eight dB. By way of example, the span budget associated with signals 732 may be approximately 38 dB. A first SOA of cascaded SOA arrangement 715 adds gain to signals 732 of lower band wavelengths and a second SOA of cascaded SOA arrangement 715 cooperates with the first SOA to add gain to signals 732 of higher band wavelengths. Hence, cascaded SOA arrangement 715, which includes an add/drop demultiplexer that prevents gain absorption of a second SOA from affecting signals 732 with lower band wavelengths, creates amplified signals 732'.

Amplified signals 732' may be sent over distances that exceed approximately 100 kilometers to a receiving node 708 that includes an optical light receiver 728. The gain added to signals 732 to create amplified signals 732' allow amplified signals 732' to be transmitted over distances that are greater than approximately 100 kilometers.

Although only a few embodiments of the present invention have been described, it should be understood that the present invention may be embodied in many other specific forms without departing from the spirit or the scope of the present invention. By way of example, while an eight channel CWDM band has been described as having wavelengths in the range between approximately 1470 nm and approximately 1610 nm spread out by approximately 20 nm, the wavelengths in an eight channel CWDM band may generally vary widely. In other words, a CWDM band may include various ranges of wavelengths. When different ranges of wavelengths are to be processed by a cascaded SOA arrangement, the peak gains for the SOAs in the SOA arrangement may be shifted to compensate for the different ranges of wavelengths.

It should be appreciated that CWDM generally combines up to approximately sixteen or eighteen channels or wavelengths onto a single fiber that are spaced apart by approximately 20 nm. For instance, 18 channels or wavelengths may be spaced 20 nm apart between approximately 1270 nm and approximately 1610 nm. Hence, although the eight channels described as being amplified by a cascaded SOA arrangement are spaced 20 nm apart between approximately 1470 nm and approximately 1610 nm, the wavelengths of the eight channels may be widely varied without departing from the spirit or the scope of the present invention. Additionally, a cascaded arrangement of SOAs may include more than two SOAs when more than eight channels are to be amplified.

Further, the number of channels processed or amplified using a cascaded SOA arrangement may vary. By way of example, while amplifying eight channels using a cascaded SOA arrangement has been described, it should be appreciated that fewer than eight channels may also be amplified using a cascaded SOA arrangement. In addition, an SOA has been described as having an approximately 80 nm gain bandwidth. For an embodiment in which SOAs in a cascaded SOA arrangement have a larger bandwidth than approximately 80 nm, it may be possible to amplify more than eight channels using the cascaded SOA arrangement.

In general, although the components of a cascaded SOA arrangement and supporting multiplexers and demultiplexers are generally hardware components, the components may include any suitable combination of hardware and software components. The software components may include program code devices arranged to perform various functions of the present invention. Further, some components may be implemented as application specific integrated circuits which may be at least partially programmed with code devices that cause various functions to be performed.

The components used to allow multiple channels to be amplified may vary. For instance, although a four channel add/drop demultiplexer has been described as being used to allow lower band channels to be dropped before being provided to a second SOA, substantially any device which allows lower band channels to drop while allowing higher band channels to pass therethrough may generally be used. Additionally, it should be appreciated that SOAs are only one example of optical amplifiers which are suitable for use in a cascaded arrangement to amplify CWDM channels. In general, any suitable optical amplifiers may be used in a cascaded arrangement to amplify CWDM channels. Therefore, the present examples are to be considered as illustrative and not restrictive, and the invention is not to be limited to the details given herein, but may be modified within the scope of the appended claims.

What is claimed is:

1. An arrangement, the arrangement being arranged to add gain to a set of optical signals, the set of signals including a first band and a second band, the second band including signals of longer wavelengths than signals of the first band, the arrangement comprising:
   a multiplexer, the multiplexer being arranged to multiplex the set of signals;
   a first semiconductor optical amplifier, the first semiconductor optical amplifier having a first gain peak at a wavelength within the first band and an attenuation region for wavelengths at or longer than the wavelengths within an upper half portion of the second band, the first semiconductor optical amplifier being arranged to receive the set of signals from the multiplexer and to provide amplification to the signals within the first band and attenuation to the signals within the attenuation region;
   a second semiconductor optical amplifier, the second semiconductor optical amplifier having a second gain peak at a wavelength within the second band, the second semiconductor optical amplifier being arranged to receive the second band after the set of signals is processed by the first optical amplifier and to provide amplification to the second band; and
   a processing arrangement, the processing arrangement being arranged to pass the second band from the first semiconductor optical amplifier to the second semiconductor optical amplifier, the processing arrangement further being arranged to substantially prevent the first band from passing from the first semiconductor optical amplifier to the second semiconductor optical amplifier.

2. The arrangement of claim 1 wherein the signals are coarse wave division multiplexing signals.

3. The arrangement of claim 2 wherein the first band includes signals with wavelengths in a first range between approximately 1470 nanometers and approximately 1530 nanometers and wherein the second band includes signals with wavelengths in a second range between approximately 1550 nanometers and approximately 1610 nanometers.

4. The arrangement of claim 3 wherein the first gain peak occurs at approximately 1500 nanometers and the second gain peak occurs at approximately 1580 nanometers.

5. The arrangement of claim 1 wherein the set of signals includes approximately eight signals, the first band including approximately four signals of the set of signals and the second band including approximately four signals of the set of signals.

6. The arrangement of claim 5 further including:
   a demultiplexer, the demultiplexer being arranged to receive the second band from the second optical amplifier after the second optical amplifier amplifies the second band, the demultiplexer further being arranged to demultiplex the second band.

7. The arrangement of claim 6 wherein the multiplexer is an eight channel multiplexer and the demultiplexer is a four channel demultiplexer.

8. The arrangement of claim 1 wherein the processing arrangement is arranged to demultiplex the first band.

9. An arrangement, the arrangement being arranged to add gain to a set of optical signals, the set of optical signals being divided into a first band and a second band, the first band including signals of shorter wavelengths than those of the signals of the second band, the arrangement comprising:
   means for multiplexing the signals included in the set of optical signals;
   a first semiconductor optical amplifier including a first gain peak at a wavelength within the first band and an attenuation region for wavelengths at or longer than the wavelengths within an upper half portion of the second band, wherein the first optical amplifier receives the signals included in the set of optical signals from the means for multiplexing and provides amplification to the signals within the first band and attenuation to the signals within the attenuation region;
   a second semiconductor optical amplifier including a second gain peak at a wavelength within the second band and for optically amplifying the signals included in the second band after the signals included in the set of optical signals are processed by the first semiconductor optical amplifier; and means for processing the signals included in the set of optical signals, the means for processing the signals being arranged to cause the signals included in the second band from the first semiconductor optical amplifier to be passed to the second semiconductor optical amplifier, wherein the means for processing the signal included in the set of optical signals is further arranged to substantially prevent the first band from passing from the first semiconductor optical amplifier to the second semiconductor optical amplifier.

10. The arrangement of claim 9 wherein the signals are coarse wave division multiplexing signals.

11. The arrangement of claim 10 wherein the first band includes signals with wavelengths in a first range between approximately 1470 nanometers and approximately 1530 nanometers and wherein the second band includes signals with wavelengths in a second range between approximately 1550 nanometers and approximately 1610 nanometers.

12. The arrangement of claim 11 wherein the first semiconductor optical amplifier has a first gain peak that occurs at approximately 1500 nanometers and the second semiconductor optical amplifier has a second gain peak that occurs at approximately 1580 nanometers.

13. The arrangement of claim 9 wherein the set of optical signals includes approximately eight signals, the first band including approximately four signals of the set of signals and the second band including approximately four signals of the set of signals.

14. The arrangement of claim 9 further including:
means for demultiplexing the second band received from the second semiconductor optical amplifier.

15. The arrangement of claim 9 wherein the means for processing the signals included in the set of optical signals include means for demultiplexing the signals included in the first band.

16. A method for amplifying a set of signals associated with an optical network, the method comprising:
providing the set of signals to a first semiconductor optical amplifier, wherein the set of signals includes a first band and a second band with the second band including signals of longer wavelengths than signals of the first band, and wherein the first semiconductor optical amplifier includes a first gain peak at a wavelength within the first band and an attenuation region for wavelengths at or longer than the wavelengths within an upper half portion of the second band;

applying gains to the signals within the first band and providing attenuation to the signals within the attenuation region using the first semiconductor optical amplifier;

providing the set of signals from the first semiconductor optical amplifier to a processing arrangement, the processing arrangement being arranged to substantially divide the set of signals into a first sub-set of signals each within the first band and a second sub-set of signals each within the second band, the processing arrangement further being arranged to provide the second sub-set of signals and not the first sub-set of signals to a second semiconductor optical amplifier;

providing the second sub-set of signals from the processing arrangement to the semiconductor second optical amplifier, wherein the second semiconductor optical amplifier includes a second gain peak at a wavelength within the second band; and applying gains to the second sub-set of signals using the second semiconductor optical amplifier.

17. The method of claim 16 further including:
multiplexing the set of signals before providing the set of signals to the first optical amplifier; and
demultiplexing the second sub-set of signals after applying the gains to the second sub-set of signals.

18. The method of claim 17 further including:
demultiplexing the first sub-set of signals using the processing arrangement.

19. The method of claim 16 wherein the set of signals is a set of CWDM signals.

20. The method of claim 19 wherein the set of signals includes approximately eight CWDM signals with wavelengths in the range between approximately 1470 nanometers and approximately 1610 nanometers.

21. The method of claim 20 wherein the first optical amplifier has a peak gain at approximately 1500 nanometers and the second optical amplifier has a peak gain at approximately 1580 nanometers.

22. The method of claim 20 wherein the first sub-set of signals includes approximately four CWDM signals with wavelengths in the range between approximately 1470 nanometers and approximately 1530 nanometers and the second sub-set of signals includes approximately four CWDM signals with wavelengths in the range between approximately 1550 nanometers and approximately 1610 nanometers.

23. An arrangement for amplifying a set of signals associated with an optical network, the arrangement comprising:
devices that cause the set of signals to be multiplexed, wherein the set of signals includes a first band and a second band with the second band including signals of longer wavelengths than signals of the first band;

devices, including a first semiconductor optical amplifier with a first gain peak at a wavelength within the first band and an attenuation region for wavelengths at or longer than the wavelengths within an upper half portion of the second band, that cause a first set of gains to be applied to the multiplexed set of signals within the first band and provides attenuation to the multiplexed set of signals within the attenuation region;

devices that cause the set of multiplexed signals to be substantially divided into a first sub-set of signals each within the first band and a second sub-set of signals each within the second band after the first optical amplifier processes the set of signals;

devices, including a second semiconductor optical amplifier with a second gain peak at a wavelength within the second band, that cause a second set of gains to be applied to the second sub-set of signals and not to the first sub-set of signals;

devices that cause the first sub-set of signals to be demultiplexed; and devices that cause the second sub-set of signals to be demultiplexed.

24. A method for amplifying a set of signals associated with an optical network, the signals being CWDM signals, the method comprising:
obtaining the set of signals, wherein the set of signals includes a first band and a second band with the second band including signals of longer wavelengths than signals of the first band;

applying a first set of gains, from a first semiconductor optical amplifier with a first gain peak at a wavelength within the first band and an attenuation region for wavelengths at or longer than the wavelengths within an upper half portion of the second band, to the signals within the first band and providing attenuation to the signals within the attenuation region;
substantially dividing the set of signals into a first sub-set of signals each within the first band and a second sub-set of signals each within the second band after processing by the first semiconductor optical amplifier; and
applying a second set of gains from a second semiconductor optical amplifier with a second gain peak at a wavelength within the second band to the second sub-set of signals and not to the first sub-set of signals.

25. The method of claim 24 further including:
multiplexing the set of signals before applying the first set of gains to the set of signals; and
demultiplexing the second sub-set of signals after applying the second set of gains to the second sub-set of signals.

26. The method of claim 25 further including:
demultiplexing the first sub-set of signals after applying the first set of gains to the set of signals.

* * * * *

UNITED STATES PATENT AND TRADEMARK OFFICE
CERTIFICATE OF CORRECTION

PATENT NO. : 7,643,758 B1 Page 1 of 1
APPLICATION NO. : 11/306618
DATED : January 5, 2010
INVENTOR(S) : Sguazzotti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this

Twenty-first Day of December, 2010

David J. Kappos
*Director of the United States Patent and Trademark Office*